May 30, 1944.　　　C. C. FUERST　　　2,350,026
FOCAL PLANE SHUTTER CONTROL
Filed July 17, 1942　　　2 Sheets-Sheet 1
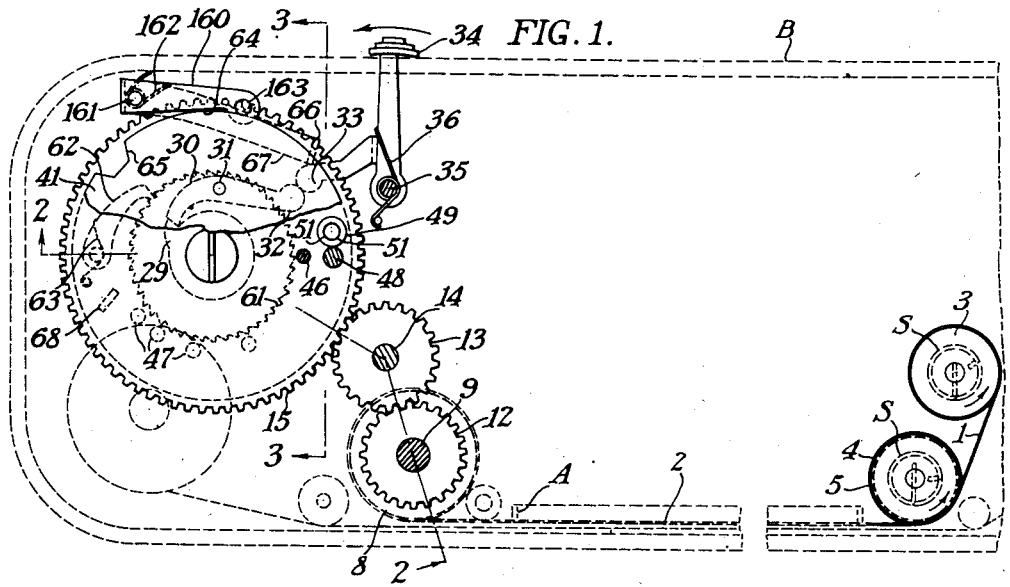
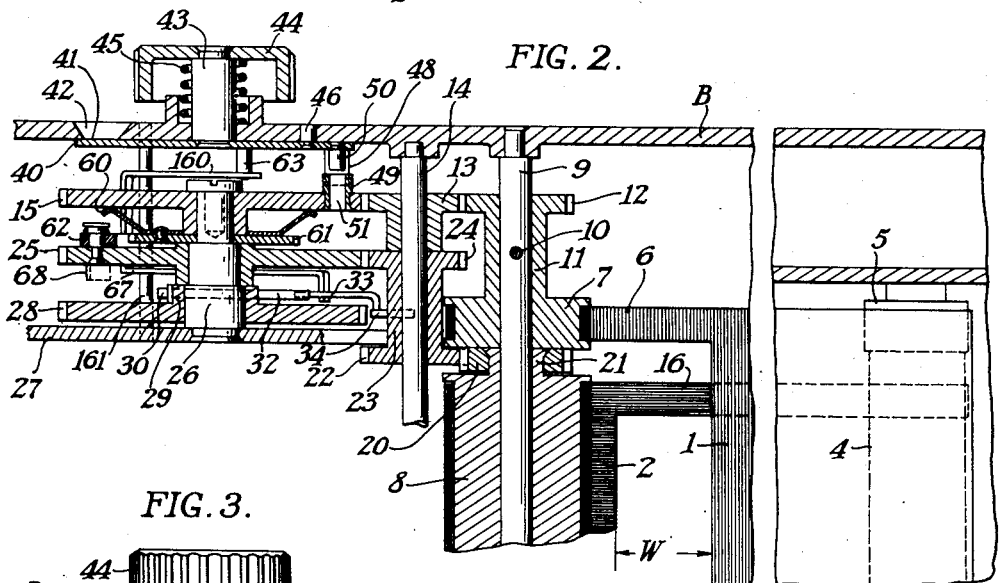
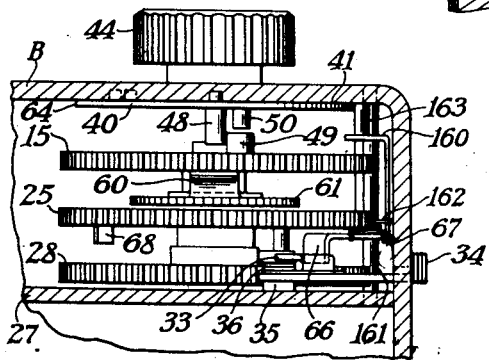
CARL C. FUERST
INVENTOR
BY
ATTORNEYS May 30, 1944.          C. C. FUERST          2,350,026
FOCAL PLANE SHUTTER CONTROL
Filed July 17, 1942          2 Sheets-Sheet 2

CARL C. FUERST
INVENTOR

BY
ATTORNEYS

UNITED STATES PATENT OFFICE 2,350,026

FOCAL PLANE SHUTTER CONTROL

Carl C. Fuerst, Rochester, N. Y., assignor to Eastman Kodak Company, Rochester, N. Y., a corporation of New Jersey Application July 17, 1942, Serial No. 451,277

12 Claims. (Cl. 95—57)

This invention relates to photography and more particularly to a control mechanism for a focal plane shutter. One object of my invention is to provide a shutter control which may adjust the shutter curtains in such a way that variously timed exposures may be obtained. Another object of my invention is to provide a shutter mechanism by which the duration of the exposure can be adjusted either before or after an exposure has been made. Another object of my invention is to provide a focal plane shutter control which is comparatively simple and which consists of relatively few simple parts. Other objects will appear from the following specification, the novel features being particularly pointed out in the claims at the end thereof.

In the past most focal plane shutters have been provided with a mechanism with which the shutter aperture or the time controlling mechanism can be set when the shutter parts are in one position. Usually this position is the run-down position which the curtains assume after an exposure has been made. In most shutters a stop can be moved so that upon rewinding the shutter to condition it for an exposure the stop will determine the slot between the curtain sections and consequently the exposure. With this type of shutter the difficulty frequently arises that an operator may wish to vary the exposure after having wound the shutter. It is then necessary to protect the film against light and permit the shutter to run down and then again set the mechanism determining the shutter speed or else to use the speed for which the shutter has already been set.

In other known types of shutters it is possible to set the focal plane shutters either before or after exposure, but in most shutters of this type the mechanism is far more complicated since they usually include some clutching mechanism which requires a separate operation on the part of an operator to properly set the shutter. It is an object of my present invention to provide a focal plane shutter with an extremely simple type of control and one which requires no additional operation on the part of the operator to set the shutter regardless of the position in which the shutter curtains may be located.

Coming now to the drawings wherein like reference characters denote like parts throughout:

Fig. 1 is a fragmentary view partially in elevation and partially in section showing a shutter control mechanism constructed in accordance with and embodying a preferred form of my invention;

Fig. 2 is a fragmentary sectional view taken on line 2—2 of Fig. 1, parts being shown in elevation;

Fig. 3 is a fragmentary detail section taken on line 3—3 of Fig. 1;

Fig. 12 is a sectional view through a curtain supporting roller.

Figure 4:
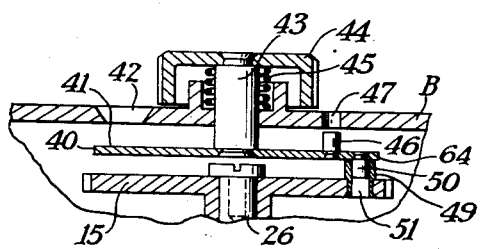
Fig. 4 is a fragmentary detail section through the shutter setting mechanism.

My invention relates to a shutter of the type employing two curtains each mounted at one end on its own individual spring roller and each mounted at its other end on a rotatable type of support, the two curtains being moved together to make an exposure of the instantaneous type or of the "bulb" type. My invention is particularly directed to the shutter control mechanism for adjusting the two shutter ends to produce slots of varying widths between the curtains in order to obtain different exposures.

More specifically, my shutter may comprise a support B which may be either a shutter housing or it may be a camera body in which the shutter is mounted. The shutter may consist of a pair of curtains, a leader curtain 1 and a follower curtain 2. The leader curtain may be attached to a spring driven roller 3 and the follower curtain may be attached to a spring driven roller 4 in a known manner. The curtain 1 may pass over guiding spools 5 in its path to its roller 3 so that it will clear the roller 4 on which the curtain 2 may be wound. The rollers 3 and 4 are provided with springs S which always tend to turn these rollers in the direction shown by the arrows to wind the curtain thereon.

The curtain 1 may be provided with suitable tapes 6 which may be wound on similar spools 7 mounted on each side of a drum 8 and carried by a shaft 9 to which the rollers may be pinned as at 10. The upper roller 7 includes a collar 11 on the end of which is a gear 12 meshing with a second gear 13 mounted to rotate freely on a shaft 14 and meshing with a gear 15 which may be considered as a curtain disk.

The follower curtain 2 may be connected by tapes 16 to the drum 4 and the other end of the curtain, as best shown in Fig. 12, may be connected to the drum 8 in any desired manner, although I prefer to provide the drum 8 with an aperture 17 so that the end of the curtain 18 may be located in the aperture and may be held therein by means of a rod 19.

The drum 8 is mounted to rotate freely on the shaft 9 and carries a gear 20 attached to a collar 21 so that this gear may rotate with the drum 8. The gear 20 may mesh with a gear 22 carried by the collar 23 which also supports a gear 24 meshing with a gear 25.

The gears 15 and 25 may turn freely on the stud shaft 26 mounted on a mechanism plate 27. Also on this shaft is a gear 28 which is the prime mover, this gear being turned to set the shutter curtains 1 and 2 in a manner to be hereinafter more fully described. The gear 28 may be driven by any suitable mechanism, either by hand or by power, but it may lie idle upon the shaft 26 except at such times as it may turn to set the shutter members.

The gear 28 is provided with a single-toothed ratchet 29 with which a pawl 30, pivoted at 31 to the gear 25, may cooperate. This pawl has an arm or extension 32 which, when the shutter is in a set position, lies in the path of the arm 33 of a trigger member 34 pivoted at 35 to the support B and having a spring 36 positioned to hold the parts in position shown in Fig. 1. When the trigger 34 is moved in the direction shown by the arrow, the one-toothed ratchet 29 is released so that the shutter may run down.

For instantaneous exposures the curtains 1 and 2 are adjusted so that the width W of a slot between these two curtains will determine the exposure. In other words, when the curtains are wound up and a slot W has been established, the release of the trigger 34 will cause the slot W to cross over the exposure aperture A and make an exposure. Repeated setting and releasing operations will continue to make the same exposure.

Figure 9:
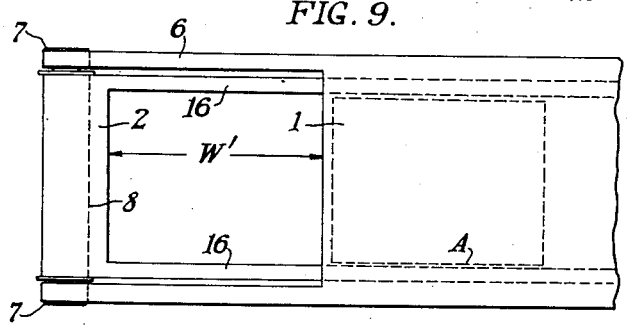
Figure 7:
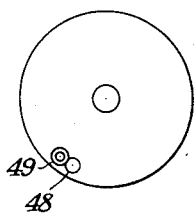
Figure 10:
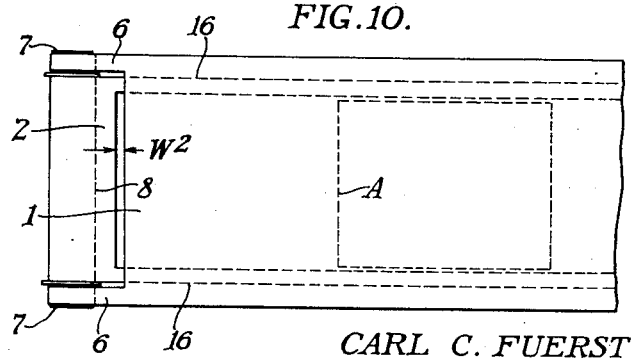

In order to adjust the exposures to produce long and short exposures the relative positions of the curtains 1 and 2 are changed. For instance, Fig. 9 shows the two curtains with the width $W^1$ of the slot between the two curtain edges an extremely large one, such a setting being used for relatively slow exposures, such as for 1/25 of a second. This is also used for "bulb" exposures. Fig. 10 shows the width of the slot $W^2$ as being quite a narrow one, such as would produce a 1/1000 of a second exposure. These indicate two extreme exposures of the instantaneous type and of course, by positioning the two shutter curtains in various positions between $W^1$ and $W^2$, exposures of various different times may be obtained. The mechanism for obtaining the various settings includes a shutter setting disk 40, as shown in Fig. 4, this disk preferably having graduations on its upper surface 41 which may be viewed through the window 42 of the support B to indicate the particular setting. The disk 40 is mounted on a shaft 43 slidably mounted in the support B and terminating in a setting knob 44 normally spring-pressed upwardly by a spring 45 so that a pin 46 may enter any one of a series of apertures 47 positioned for various different shutter settings.

The setting disk is provided with a stop pin 48, best shown in Fig. 3, this stop pin lying in the path of a cooperating stop pin 49 carried by the curtain disk or gear 15. The disc 41 likewise is provided with a second pin 50 which constitutes one member of a coupling device, the other member of which is an aperture 51 which is drilled in the stop pin 49 so that it may receive the coupling member 50 carried by the disc 40 when the knob 44 is moved against the pressure of spring 45 into the position shown in Fig. 4. Thus, the curtain disk or gear 15 is provided with both a stop pin and a coupling member, which in this instance may be made in one piece.

In order to set the shutter the knob 44 is moved downwardly to release the pin 46 from an aperture 47 and it is then turned until the required time may appear through the window 42. This may be done at any time. If the shutter has just made an exposure and the setting knob 44 is turned, it will merely position the stop pin 48 so that, when the prime mover or gear 28 is moved to wind the shutter, both curtains will be turned by the prime mover into a position in which the springs S in the rollers 3 and 4 will be placed under tension. This movement occurs since the gear 25 is turned through the pawl 30 and ratchet tooth 29 and since this gear 25 transmits motion to the gear 15 to a slip clutch including spring members 60 carried by a ratchet wheel 61, the teeth of which may be engaged by a pawl 62 spring pressed into engagement with the teeth by a spring 63. Thus, the gear 25 will turn approximately one revolution in winding up the shutter 2, whereas the distance that the shutter 1 will move will be controlled by the position of the stop pin 48, since the gear 15 will be turned through the slip clutch 60 only until the pin 49 strikes the pin 48 as indicated in Fig. 3. This will control the width W of the slot between the curtain members but the extent of movement of the curtain members is such that the curtain 1 will always be moved until the aperture A, through which exposures are made, is completely covered.

Thus, if the knob 44 has been turned for a required exposure when the shutter is run down, the action above described will take place. However, if the shutter has been wound, by turning the prime moving gear 28 as above described, and the operator should decide that he wishes to again alter the width of the slot W to produce a different exposure, this may still be done by means of the coupling members 50, 51. The operator is not conscious of any different setting operation, since, as before, he merely presses downwardly upon the knob 44 to turn the setting disk 40 until the proper indicating mark on the surface 41 of the disk appears below the window 42. But if the shutter has been tensioned the stop pins 48 and 49 are located as shown in Fig. 3 so that the downward pressure upon the knob 44 engages the coupling members 50, 51 and positively unites the setting disk 41 with the shutter disk or gear 15. When so coupled they may be moved together by turning the knob 44 as the clutch member 60 slips. Thus they may be turned to any desired position and when the time or width of the slot has been selected the knob 40 is permitted to rest under the impulse of its spring 45 causing the pin 46 to enter a locating aperture 47. When this is done, the coupling members 50, 51 become disengaged and an exposure may proceed as before. It might be pointed out that the pin 49 serves two purposes in that the outside of this member is the stop pin on the shutter disk 15 and the aperture 51 inside of the pin forms the coupling member.

Figure 11:
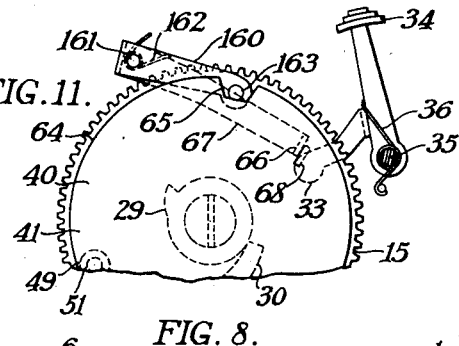
Fig. 11 is a fragmentary view partially in elevation showing the bulb lever in a position to produce a bulb exposure.
Figure 5:
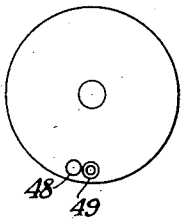
Figs. 5, 6 and 7 are plan views partially in section showing the relationship of the setting disk and of the curtain disk in various different positions.
Figure 8:
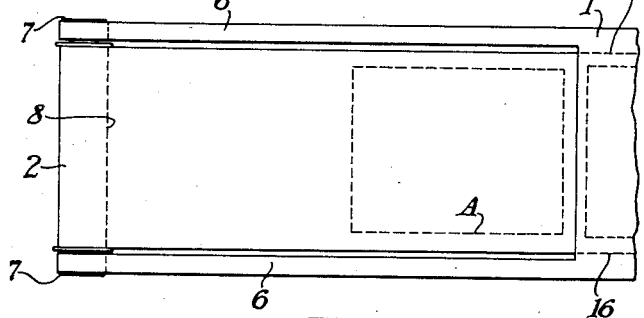
Figs. 8, 9 and 10 are schematic views showing the relationship of the curtains to the exposure aperture when the curtains are in different positions.
Figure 6:
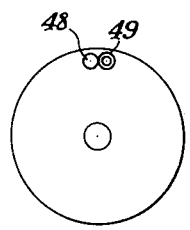

In order to obtain prolonged exposures or exposures commonly called "bulb" exposures, I provide a separate mechanism which will act to hold the second shutter against movement when the trigger is depressed and until the trigger is released at which time the shutter aperture A will be closed by the second shutter. As shown in Figs. 1 and 11, the bulb mechanism includes a lever 160, pivoted at 161 to the mechanism plate, and pressed by a spring 162 in the direction shown by the arrow, Fig. 11, so as to hold a pin 163 either against the periphery 64 of the setting disk 40, or to cause the pin to drop into a notch 65 when the shutter setting disk is moved to its "bulb" position. In this position a stop 66 carried by arm 67 of the lever is brought into the path of a stop lug 68 which is carried by gear 25, and which is so positioned on the gear that the shutter 2 may be held against movement and uncovering the aperture A while the shutter 1 which is already across the aperture A is also held still. As long as the stop lug 68 and lever 33 are in the position shown in Fig. 6, the shutter remains open. When the trigger 34 is moved its spring 36 is released so that the trigger moves pin 163 from the notch 65 so that the shutter may close.

When a bulb exposure is to be made the trigger 34 is moved so as to release the lever 30 permitting the first shutter member to move across the exposure aperture A and permitting the shutter 2 to move only until lug 68 strikes lug 66, in which position the edge of the curtain 2 will lie adjacent the edge of the exposure aperture A with the exposure aperture A completely uncovered. Both curtains then stop since they move in unison in making an exposure. By releasing the trigger 34 the spring 36 will cause this lever to move in the direction opposite to that shown by the arrow in Fig. 1 and such movement causes the arm 33 to lift arm 67 of the bulb lever out of the depression 65 in the disk 40 and out of the path of the stop lug 68. This permits the shutter curtains 1 and 2 to move under the impulse of their springs in rollers 3 and 4 to cover the exposure aperture A.

If the knob 44 is turned until the pin 163 rides on the periphery 64 of the shutter setting disk 40, the lug 66 will be held out of the path of the lug 68 as in Fig. 1. The stop lever is held in this position for all exposures except the "bulb" exposure which can occur only when the notch 65 is brought in position to receive the pin 163 as indicated in Fig. 11.

The operation of this shutter is extremely simple. If an operator wishes to make a 1/1000 second exposure, he merely presses the knob 44 and turns the disk 40 until the proper graduation appears through the window 42. This operation may take place regardless of the location of the shutter curtains. If the shutter curtains have been wound by turning the prime mover 28, the stop pins 48 and 49 are in the position shown in Fig. 3 in which they locate the coupling members 50, 51 so that, by depressing the knob the coupling members temporarily unite the setting disk 40 and the curtain disk 15 so that they may be moved together as the clutch 60 slips and until the desired speed appears in the window 42. If, on the other hand, the shutter has not been set by turning the knob 44 as above described the stop pin will merely be placed somewhere in the path of the stop pin 49 so that, when the shutter is turned for winding the curtain springs, curtain 2 will be completely wound through its gearing 25, 24, 23 and gear 20 and curtain 1 will be turned through its gearing 15, 13 and gear 12, and will be permitted to turn only until the stop pin 49 strikes the stop pin 48. This turning movement is always sufficient to completely close the aperture A, but it is not sufficient to close up the slot W between the two ends of the curtain members 1 and 2.

Thus I have provided a simple shutter adjusting mechanism which operates in two distinctly different manners, one when the shutter is set and the other when the shutter is unwound. Either of these two modes of operation of the mechanism does not require any extra operations by the operator because in one case he merely sets a stop pin in a position to adjust the shutter slot while the curtains are being wound, and in the other position the stop pins have properly located coupling members so that they will be automatically coupled and will permit the operator to adjust the width of a slot between the wound curtains. In either case, as far as the operator is concerned, the same steps are taken in setting the shutter.

It is obvious that, while I have described a preferred embodiment of my invention, other embodiments may be made without departing from my invention. I consider as within the scope of my invention all such forms as may come within the scope of the appended claims.

I claim:

1. In a focal plane shutter of the type employing two curtains each mounted on an individual spring roller at one end and on separate rotatable supports at the other end and means for providing predetermined widths of slot between the ends of the curtains to produce different exposures, the combination with said means for providing predetermined widths of slot for exposures, of a control therefor including a pair of separately rotatable disks, one of said disks constituting a setting disk, the other of said disks constituting a curtain disk movable with a shutter curtain, cooperating stops one on each disk whereby movement of the curtain disk may be limited, and a pair of coupling members, one carried by the setting disk and the other carried by the curtain disk, a mount on which the setting disk may move axially to engage the coupling members when properly positioned for turning the curtain disk from the setting disk for adjusting one curtain relatively to the other.

2. In a focal plane shutter of the type employing two curtains each mounted on an individual spring roller at one end and on separate rotatable supports at the other end and means for providing predetermined widths of slot between the ends of the curtains to produce different exposures, the combination with said means for providing predetermined widths of slot for exposures, of a control therefor including a pair of separately rotatable disks, one of said disks constituting a setting disk, the other of said disks constituting a curtain disk movable with a shutter curtain, cooperating stops one on each disk whereby movement of the curtain disk may be limited, and a pair of coupling members, one carried by the setting disk and the other carried by the curtain disk, a mount on which the setting disk may move axially to engage the coupling members when properly positioned for turning the curtain disk from the setting disk for adjusting one curtain relatively to the other and means for holding the setting disk in a predetermined position operable when said setting disk moves axially to release said coupling members.

3. In a focal plane shutter of the type employing two curtains each mounted on an individual spring roller at one end and on separate rotatable supports at the other end and means for providing predetermined widths of slot between the ends of the curtains to produce different exposures, the combination with said means for providing predetermined widths of slot for exposures, of a control therefor including a pair of separately rotatable disks, one of said disks constituting a setting disk, the other of said disks constituting a curtain disk movable with a shutter curtain, cooperating stops one on each disk whereby movement of the curtain disk may be limited, and a pair of coupling members, one carried by the setting disk and the other carried by the curtain disk, a mount on which the setting disk may move axially to engage the coupling members when properly positioned for turning the curtain disk from the setting disk for adjusting one curtain relatively to the other, said cooperating stops on the shutter disk and curtain disk being so located relative to the stop pins that said coupling members may be automatically engaged by moving the setting disk axially when the cooperating stop pins are in engagement after setting the shutter; and means for setting the shutter comprising mechanism for simultaneously winding both curtains.

4. In a focal plane shutter of the type employing two curtains each mounted on an individual spring roller at one end and on separate rotatable supports at the other end and means for providing predetermined widths of slot between the ends of the curtains to produce different exposures, the combination with said means for providing predetermined widths of slot for exposures, of a control therefor including a pair of separately rotatable disks, one of said disks constituting a setting disk, the other of said disks constituting a curtain disk movable with a shutter curtain, cooperating stops, one on each disk whereby movement of the curtain disk may be limited, and a pair of coupling members, one carried by the setting disk and the other carried by the curtain disk, a mount on which the setting disk may move axially to engage the coupling members when properly positioned for turning the curtain disk from the setting disk for adjusting one curtain relatively to the other, said cooperating stops on the shutter disk and curtain disk, means for winding the shutter members together including a driving element, a driven element and a friction clutch between one curtain and the driving element, said cooperating stops on the shutter and setting disks becoming engaged in setting the shutter, and coupling members carried by the shutter and setting disks positioned to automatically engage by moving said setting disk axially when said cooperating stops are in curtain winding engagement.

5. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a winding member, a pawl and ratchet and friction clutch between the curtain gearing and the winding member whereby said curtains may move together or separately, direct connections between the winding member and one curtain, indirect connections through the friction clutch between the winding member and the other curtain, a curtain disk and stop pin movable with the second curtain, a setting disk and stop pin coaxially arranged with the curtain disk whereby the setting of the setting disk stop pin may limit the winding movement of one shutter curtain, and a pair of coupling members carried by the setting and curtain disks and adapted to be positioned for engagement when the stop pins come into engagement.

6. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a winding member, a pawl and ratchet and friction clutch between the curtain gearing and the winding member whereby said curtains may move together or separately, direct connections between the winding member and one curtain, indirect connections through the friction clutch between the winding member and the other curtain, a curtain disk and stop pin movable with the second curtain, a setting disk and stop pin coaxially arranged with the curtain disk whereby the setting of the setting disk stop pin may limit the winding movement of one shutter curtain, and a pair of coupling members carried by the setting and curtain disks and adapted to be positioned for engagement when the stop pins come into engagement, whereby a slot of a predetermined width may be formed between the curtains, and means operable after winding the shutter curtains to a set position for opening or closing the shutter slot so formed.

7. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a winding member, a pawl and ratchet and friction clutch between the curtain gearing and the winding member whereby said curtains may move together or separately, direct connections between the winding member and one curtain, indirect connections through the friction clutch between the winding member and the other curtain, a curtain disk and stop pin movable with the second curtain, a setting disk and stop pin coaxially arranged with the curtain disk whereby the setting of the setting disk stop pin may limit the winding movement of one shutter curtain, and a pair of coupling members carried by the setting and curtain disks and adapted to be positioned for engagement when the stop pins come into engagement, whereby a slot of a predetermined width may be formed between the curtains, and means operable after winding the shutter curtains to a set position for opening or closing the shutter slot so formed, and comprising a positive coupling between the setting disk and the shutter disk for altering the width of the slot formed between the curtains.

8. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a setting disk including a notch in its periphery, a curtain stop lever pivotally mounted adjacent said setting disk and including a pin resting on the periphery of the setting disk and adapted to drop into the notch therein, gearing movable with the second curtain, a stop pin carried by said gear included in said gearing positioned to swing through a path, the end of said stop lever intersecting said path for holding said curtain in an open position when the pin rests in the notch and the stop pin and lever engage, and a trigger member for releasing the stop pin by moving the stop lever from the notch in said setting disk.

9. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a setting disc including a notch in its periphery, a curtain stop lever pivotally mounted adjacent said setting disk and including a pin resting on the periphery of the setting disk and adapted to drop into the notch therein, gearing movable with the second curtain, a stop pin carried by said gear included in said gearing positioned to swing through a path, the end of said stop lever intersecting said path for holding said curtain in an open position when the pin rests in the notch and the stop pin and lever engage, and a trigger member for releasing the stop pin by moving the stop lever from the notch in said setting disk, a latch for releasing the first curtain, said trigger being positioned to move the curtain latch when moved in one direction.

10. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a setting disc including a notch in its periphery, a curtain stop lever pivotally mounted adjacent said setting disk and including a pin resting on the periphery of the setting disk and adapted to drop into the notch therein, gearing movable with the second curtain, a stop pin carried by said gear included in said gearing positioned to swing through a path, the end of said stop lever intersecting said path for holding said curtain in an open position when the pin rests in the notch and the stop pin and lever engage, and a trigger member for releasing the stop pin by moving the stop lever from the notch in said setting disk, a latch for releasing the first curtain, said trigger being positioned to move the curtain latch when moved in one direction, and to move the stop lever releasing the other curtain when moved in a reverse direction.

11. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a setting disk including a notch in its periphery, a curtain stop lever pivotally mounted adjacent said setting disk and including a pin resting on the periphery of the setting disk and adapted to drop into the notch therein, gearing movable with the second curtain, a stop pin carried by said gear included in said gearing positioned to swing through a path, the end of said stop lever intersecting said path for holding said curtain in an open position when the pin rests in the notch and the stop pin and lever engage, and a trigger member for releasing the stop pin by moving the stop lever from the notch in said setting disk, a latch for releasing the first curtain, said trigger being positioned to move the curtain latch when moved in one direction, and to move the stop lever releasing the other curtain when moved in a reverse direction, a setting handle carried by the setting disk and a pin and aperture means for holding the setting disk in a set position whereby the said stop lever may be moved to or from an operative position in which it may engage the notch in the setting disk.

12. In a focal plane shutter of the type including two curtains each mounted at one end on individual spring rollers and at the other end on separately rotatable supports, the combination with said curtains, of mechanism for winding said curtains to tension their spring rollers including gearing connecting the separately rotatable supports, a setting disk including a notch in its periphery, a curtain stop lever pivotally mounted adjacent said setting disk and including a pin resting on the periphery of the setting disk and adapted to drop into the notch therein, gearing movable with the second curtain, a stop pin carried by said gear included in said gearing positioned to swing through a path, the end of said stop lever intersecting said path for holding said curtain in an open position when the pin rests in the notch and the stop pin and lever engage, and a trigger member for releasing the stop pin by moving the stop lever from the notch in said setting disk, the shape of the periphery of the setting disk being such that the curtain stop lever may be held out of the path of the stop pin carried by said gear except at such times as the lever may be positioned by the notch in the periphery of the disk.

CARL C. FUERST.